United States Patent
Albrecht et al.

(10) Patent No.: US 7,196,902 B2
(45) Date of Patent: Mar. 27, 2007

(54) DISK DRIVE COUPLING APPARATUS FOR RIGIDLY COUPLING A DISK DRIVE TO A CHASSIS OF A COMPUTER

(75) Inventors: David W. Albrecht, San Jose, CA (US); Akihiko Aoyagi, San Jose, CA (US); Fu-Ying Huang, San Jose, CA (US); Qinghua Zeng, San Jose, CA (US)

(73) Assignee: Hitachi Global Storage Technologies B.V., Amsterdam (NL)

( * ) Notice: Subject to any disclaimer, the term of this patent is extended or adjusted under 35 U.S.C. 154(b) by 47 days.

(21) Appl. No.: 11/047,874

(22) Filed: Jan. 31, 2005

(65) Prior Publication Data

US 2006/0171108 A1   Aug. 3, 2006

(51) Int. Cl.
*H05K 5/00* (2006.01)

(52) U.S. Cl. ............... 361/685; 361/732; 174/52.1; 360/97.02

(58) Field of Classification Search ........ 361/679–687, 361/724–727, 729, 730, 732; 174/52.1, 50; 248/73, 560, 562; 360/97.02, 97.03
See application file for complete search history.

(56) References Cited

U.S. PATENT DOCUMENTS

| | | |
|---|---|---|
| 4,749,164 A | 6/1988 | Leo et al. |
| 5,149,048 A | 9/1992 | Morehouse et al. |
| 5,668,697 A | 9/1997 | Dowdy |
| 5,703,734 A | 12/1997 | Berberich et al. |
| 5,958,212 A | 9/1999 | Yamamura et al. |
| 6,169,718 B1 | 1/2001 | Matusi |
| 6,324,054 B1 | 11/2001 | Chee et al. |
| 6,359,836 B1 | 3/2002 | Sevier et al. |
| 6,704,161 B1 | 3/2004 | Pham et al. |
| 6,771,495 B2 * | 8/2004 | Fujiwara et al. ............ 361/685 |
| 6,909,599 B2 * | 6/2005 | Lee et al. .................... 361/685 |
| 2004/0032710 A1 | 2/2004 | Fujiwara et al. |

FOREIGN PATENT DOCUMENTS

| | | |
|---|---|---|
| JP | 63069086 | 3/1988 |
| JP | 9017169 | 1/1997 |
| JP | 2001114344 | 4/2001 |
| JP | 2002154529 | 5/2002 |
| WO | WO 96/34390 | 10/1996 |

OTHER PUBLICATIONS

"Reducing Hard Disk File Handling Damage by using a Protective User Frame" IBM TBD, May 1992, pp. 263ff.

* cited by examiner

*Primary Examiner*—Hung Van Duong

(57) ABSTRACT

Embodiments of the present invention pertain to a disk drive coupling apparatus for rigidly coupling a disk drive to a chassis of a computer. In one embodiment, the disk drive coupling apparatus includes a disk drive to chassis coupler and a disk drive to chassis coupler engaging mechanism. One end of the disk drive to chassis coupler can be coupled to the chassis of the computer. The disk drive to chassis coupler engaging mechanism is capable of causing the other end of the disk drive to chassis coupler to apply pressure to the disk drive, thus, the disk drive can be rigidly coupled to the chassis.

23 Claims, 29 Drawing Sheets

Top View

Side View Along X-axis 112

Side View Along Y-axis 116

Side View Along X-axis 112

Top View

Side View Along X-axis 112

Cross Section View

DISK DRIVE COUPLING APPARATUS FOR RIGIDLY COUPLING A DISK DRIVE TO A CHASSIS OF A COMPUTER

TECHNICAL FIELD

Embodiments of the present invention relates to disk drives. More specifically, embodiments of the present invention relate to coupling a disk drive to a chassis of a computer.

BACKGROUND ART

In computer systems, disk drives are typically used to store data. Data can be read from and written to the disk drive. FIG. 1A depicts a 3 dimensional perspective illustration of a prior art disk drive 100 and FIG. 1B depicts a 2 dimensional perspective illustration of the same prior art disk drive 100. Here, "computer" means any host system and associated disk drive(s) that could be a desktop or notebook, personal computer server, data storage system, or consumer electronics device, such as an audio player, video recorder, Global Positioning System (GPS), car navigator, etc. An example of an audio player is an MP3 audio player.

A disk drive 100 is typically comprised of a disk enclosure 102 having a base and cover and includes one or more platters 106 (also commonly known as "magnetic disks"), an arm 104, and a read/write head 110 that is attached to the arm 104, among other things. The platter 106 rotates around a central drive hub 108 while the arm 104 is used to position the read/write head 110 on the desired location for reading data from or writing data to the platter 106. Once the arm 104 has positioned the read/write head 110 on the correct position, the read/write head 110 reads data from or writes data to the platter 106.

FIG. 1A depicts a 3 dimensional perspective illustration of a disk drive 100 where the 3 dimensions are represented by the x-axis 112, y-axis 116, and z-axis 114. FIG. 1B depicts a 2 dimensional perspective illustration of the same disk drive 100 where the 2 dimensions are presented by the x-axis 112 and the z-axis 114. The z-axis 114 is perpendicular to the central drive hub 108. The x-axis 112 is depicted as running along the shortest side of the disk drive 100 while the y-axis 116 is depicted as running along the longest side of the disk drive 100. Moving a disk drive 100 quickly in an up and down motion, from being dropped for example, would result in the disk drive 100 being subjected to a shock along the z-axis 114. In this case, there is a potential for the read/write head 110 coming into contact with the platter 106 resulting in loss of data and/or permanent damage to the surface of the platter 106 if a drive 100 is in operating condition.

Disk drives 100 have to be designed to withstand shocks resulting from being dropped or moved quickly from side to side. For example, usually after a disk drive 100 has been inserted into a computer, the computer and the associated disk drive 100 remain in a relatively stable position. However, before the disk drive 100 has been inserted into the computer, for example, while the disk drive 100 is being transported from the manufacturers to a customer, or while the disk drive 100 is being installed into a computer, the disk drive 100 is prone to being dropped, moved quickly from side to side, rotated, tilted, etc. If a disk drive 100 is subjected to shocks in non-operating state, it will cause motor bearing damage and/or cause the platter 106 to slip along the X-Y plane, or cause damage to the platter 106 if the read/write head 110 comes in contact with the platter 106. Such shocks can also degrade the disk drive 100's performance. And if the shock level is big enough, it results in loss of data on the platter 106.

Therefore, various mechanisms have been devised for protecting the disk drive 100 from damage resulting from shocks. One mechanism that has been devised for protecting a disk drive 100 from being damaged involves using shock absorbers 104, such as springs or dampening material, to couple the disk drive 100 to the enclosure 102 surrounding the disk drive.

FIGS. 1C–1F depict a prior art disk drive supported within an enclosure that uses shock absorbers. FIG. 1C is a top view of a disk drive within that enclosure. FIG. 1D is a rotated view of the disk within that enclosure. FIG. 1E is a side view along the y-axis 116 of the disk drive within that enclosure. FIG. 1F is a side view along the x-axis 112 of the disk drive within that enclosure. The shock absorbers 104 can absorb a certain amount of the shock energy, thus, reducing the amount of the energy that is transferred from the enclosure 102 to the disk drive 100. Thus, the shock absorbers 104 can minimize the possibility of damage to the disk drive 100 while the disk drive 100 is being transported or being installed, for example.

However, once the disk drive 100 supported within the enclosure 102 is installed, the shock absorbers can reduce the disk drive 100's performance. For example, when read or write operations are being performed, the arm 104 moves back and forth over the platter 106 of the disk drive 100 resulting in a certain amount of vibration with in the disk drive 100. In this case, the shock absorbers can accentuate the vibration thus increasing the amount of time the arm 104 needs for seeking the requested data from the platter 106. The shock absorbers can amplify the environmental vibration around its fundamental frequency range (such as 300 Hz to 400 Hz). If there is a strong environmental vibration in this frequency range, the shock absorber can degrade the drive performance, for example.

For these and other reasons, there is a need for an apparatus that minimize the possibility of damage to the disk drive while the disk drive is being transported or being installed but at the same time does not reduce the disk drive's performance.

DISCLOSURE OF THE INVENTION

Embodiments of the present invention pertain to a disk drive coupling apparatus for rigidly coupling a disk drive to a chassis of a computer. In one embodiment, the disk drive coupling apparatus includes a disk drive to chassis coupler and a disk drive to chassis coupler engaging mechanism. One end of the disk drive to chassis coupler can be coupled to the chassis of the computer. The disk drive to chassis coupler engaging mechanism is capable of causing the other end of the disk drive to chassis coupler to apply pressure to the disk drive, thus, the disk drive can be rigidly coupled to the chassis.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Physical Structure of a Disk Drive Coupling Apparatus

The following discussion will begin with a description of the physical structures of disk drive coupling apparatuses for rigidly coupling a disk drive to a chassis of a computer, according to embodiments of the present invention. This discussion will then be followed with a description of a method of manufacturing disk drive coupling apparatuses and a method of using disk drive coupling apparatuses for rigidly coupling a disk drive to a chassis of a computer, according to embodiments of the present invention FIGS. 2A–6C are block diagrams of exemplary a disk drive coupling apparatus, according to embodiments of the present invention. The blocks in FIGS. 2A–6C can be arranged differently than as illustrated, and can implement additional or fewer features than what are described herein. Further, the features represented by the blocks in FIGS. 2A–6C can be combined in various ways.

Figure 1A:
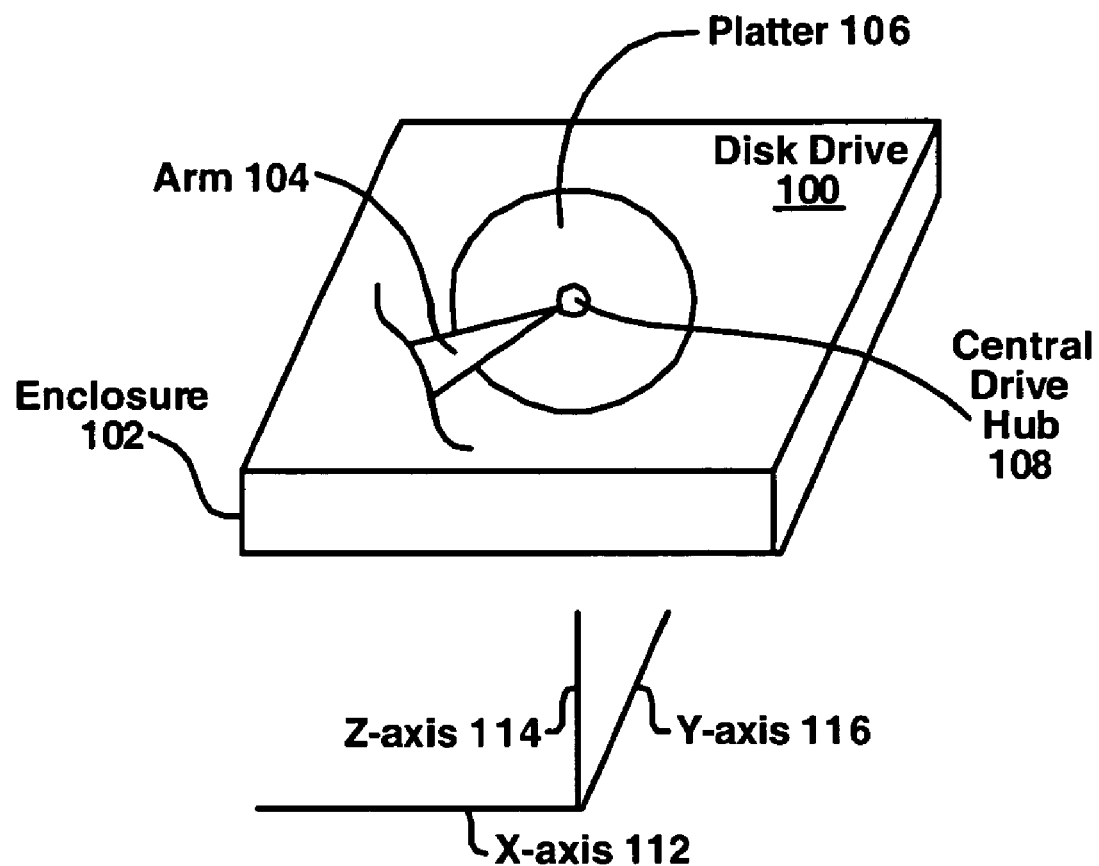
FIG. 1A depicts a 3 dimensional perspective illustration of a prior art disk drive.
Figure 1B:
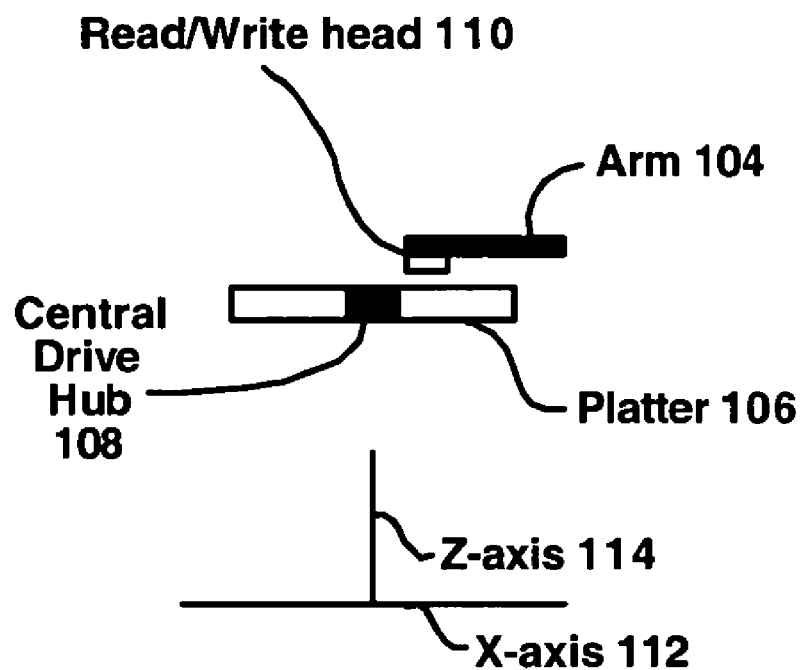
FIG. 1B depicts a 2 dimensional perspective illustration of the same prior art disk drive.
Figure 1C:
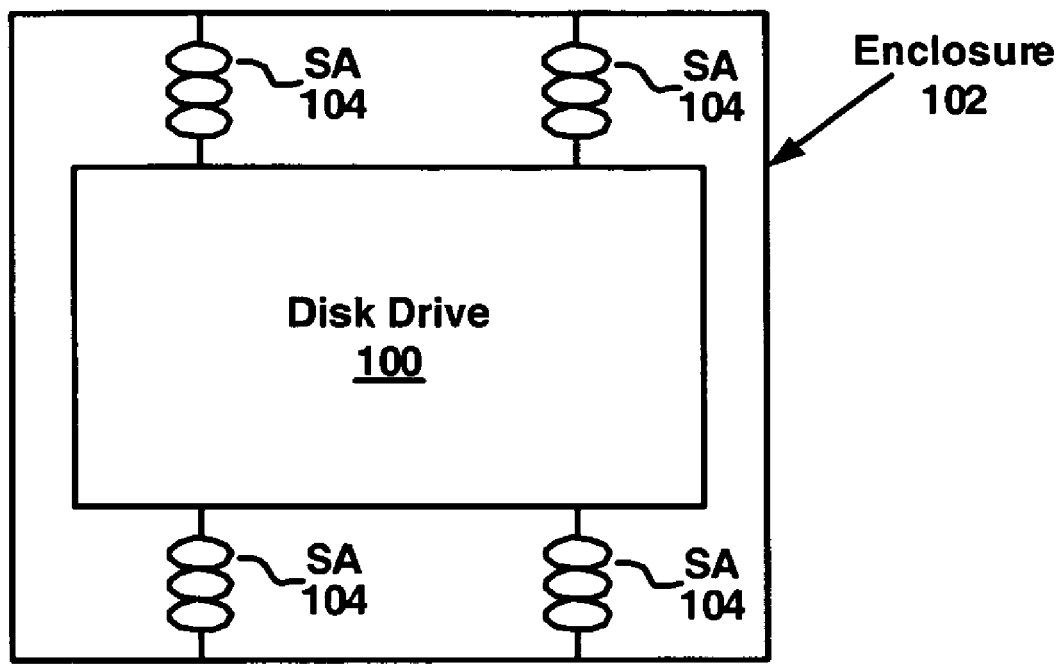
FIGS. 1C–1F depict a prior art disk drive supported within an enclosure that uses shock absorbers.
Figure 1D:
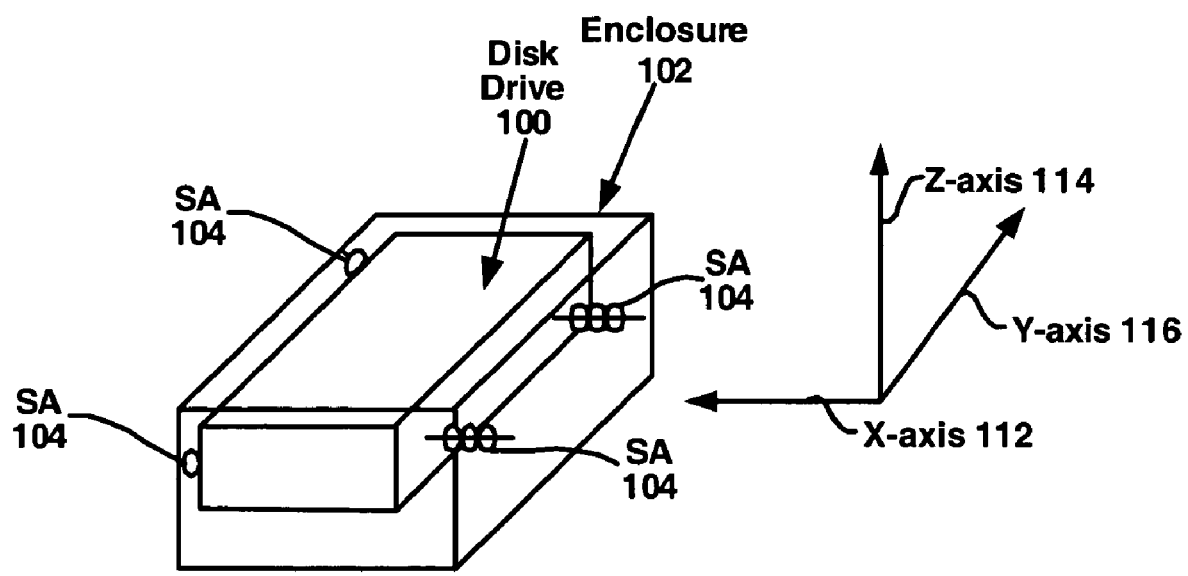
Figure 1E:
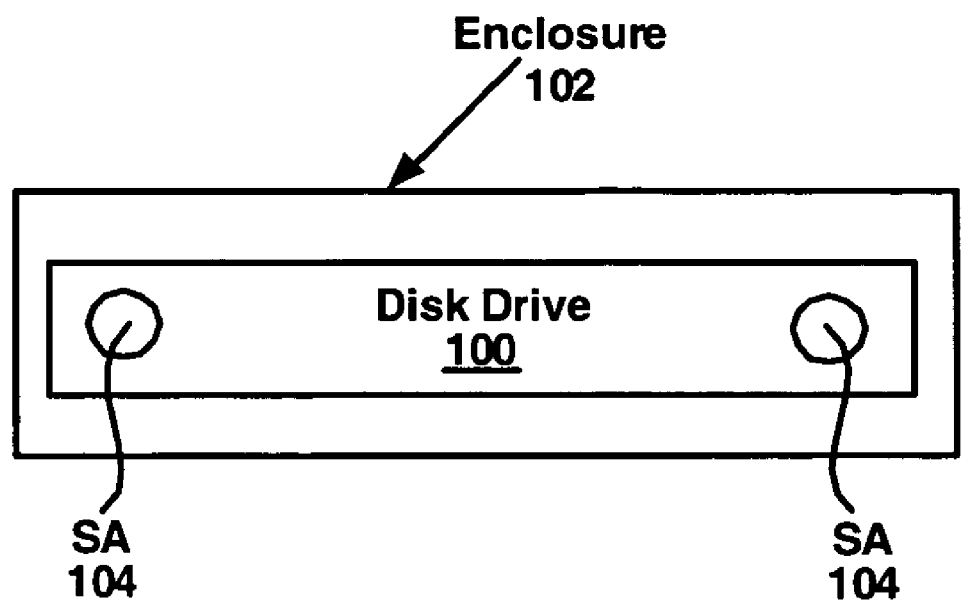
Figure 1F:
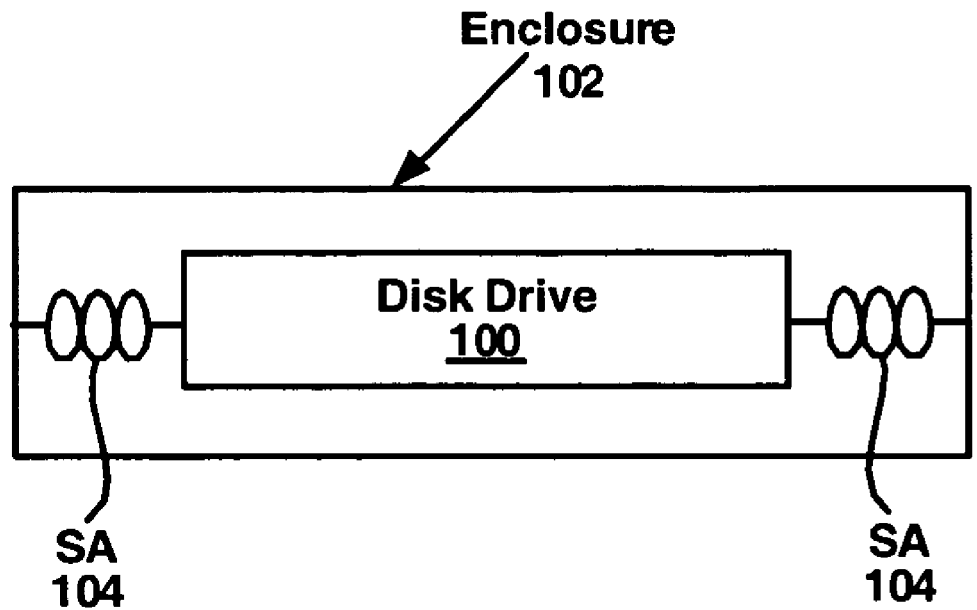
Figure 2A:
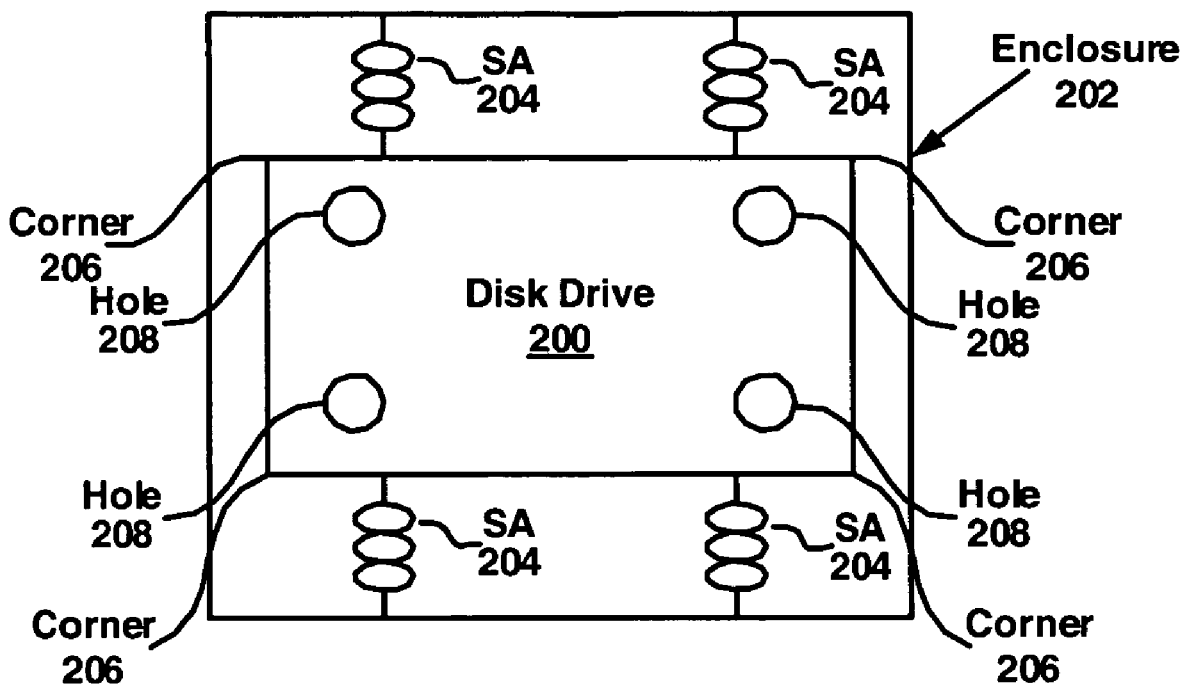
FIGS. 2A–2D depict an apparatus that includes a part of a disk drive coupling apparatus, according to embodiments of the present invention.
Figure 2B:
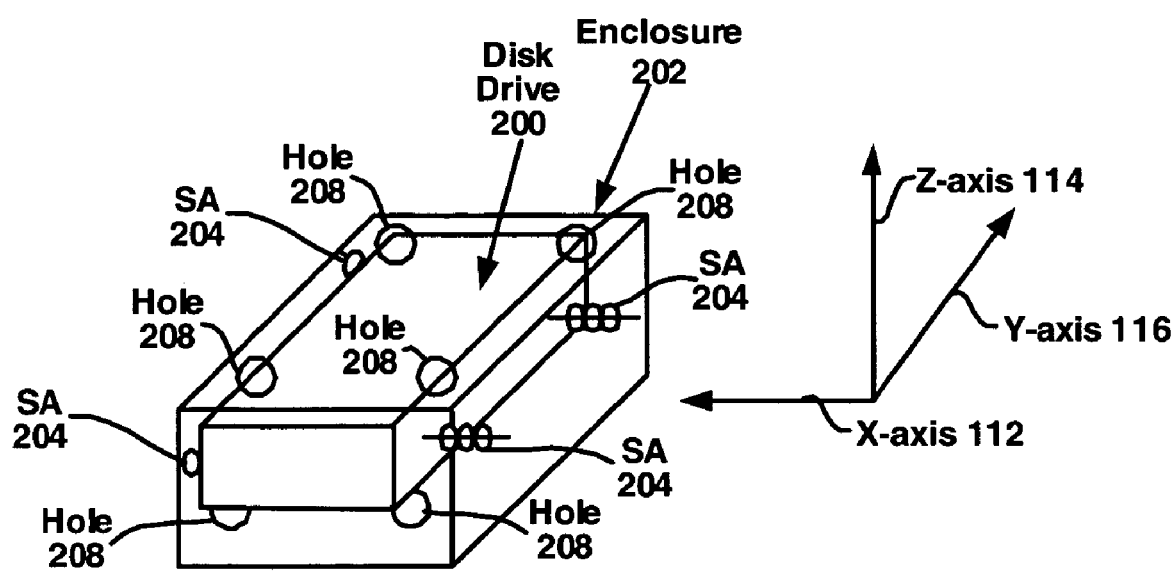
Figure 2C:
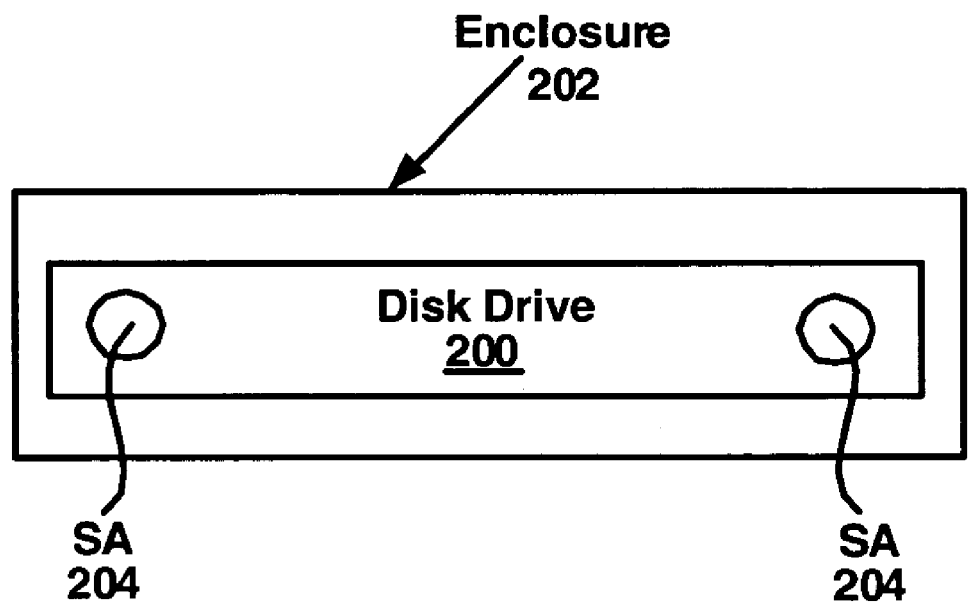
Figure 2D:
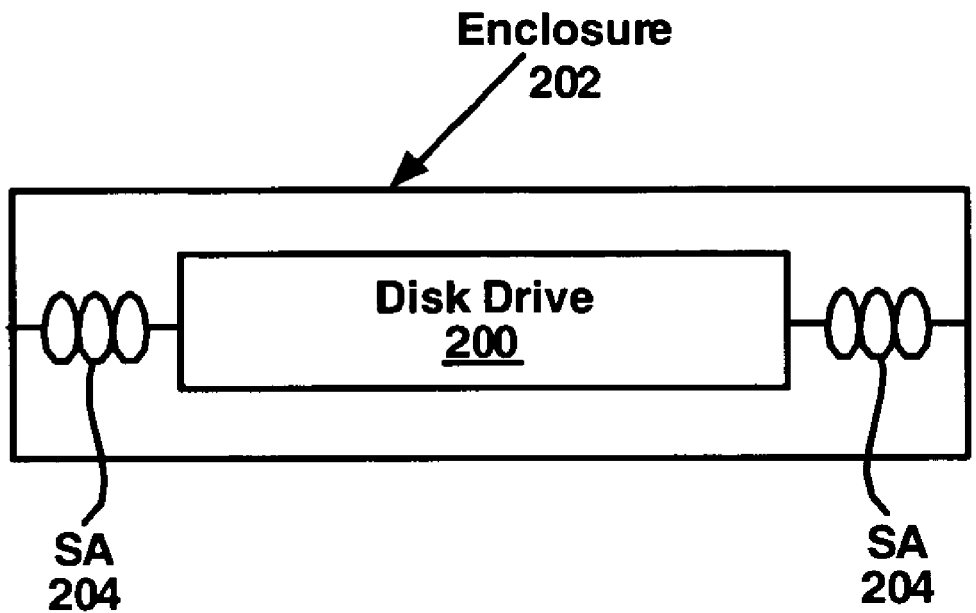

FIGS. 2A–2D depict an apparatus that includes a part of a disk drive coupling apparatus, according to embodiments of the present invention. FIG. 2A is a top view of the apparatus, FIG. 2B is a rotated view of the apparatus, FIG. 2C is a side view along the y-axis 116 of the apparatus, and FIG. 2D is a side view along the x-axis 112 of the apparatus. The apparatus includes a disk drive 200, an enclosure 202 for the disk drive 200, shock absorbers 204, and holes 208 in the enclosure 202. As depicted in FIGS. 2A–2D, there are 8 holes 208 where 4 of the holes 208 can be on the top side of the enclosure 202 and the other 4 holes 208 can be on the bottom side of the enclosure 202. Further, the holes 208 can be in close proximity to the corners 206 of the disk drive 200. Although the holes 208 are depicted on the top side and the bottom side of the enclosure 202, the holes 208 can be placed else where in the enclosure 202. For example, the holes 208 could be in the sides of the enclosure 202 instead.

Figure 3A:
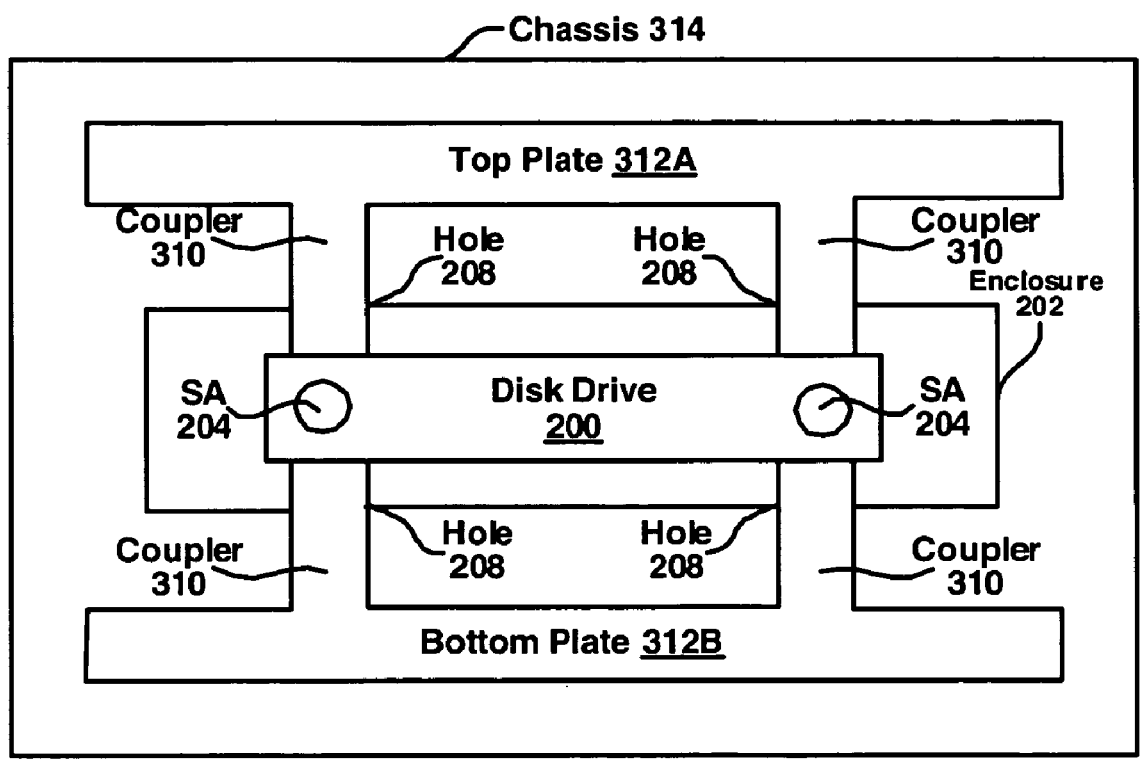
FIGS. 3A–6C depict apparatuses that include disk drive coupling apparatuses, according to embodiments of the present invention.
Figure 3B:
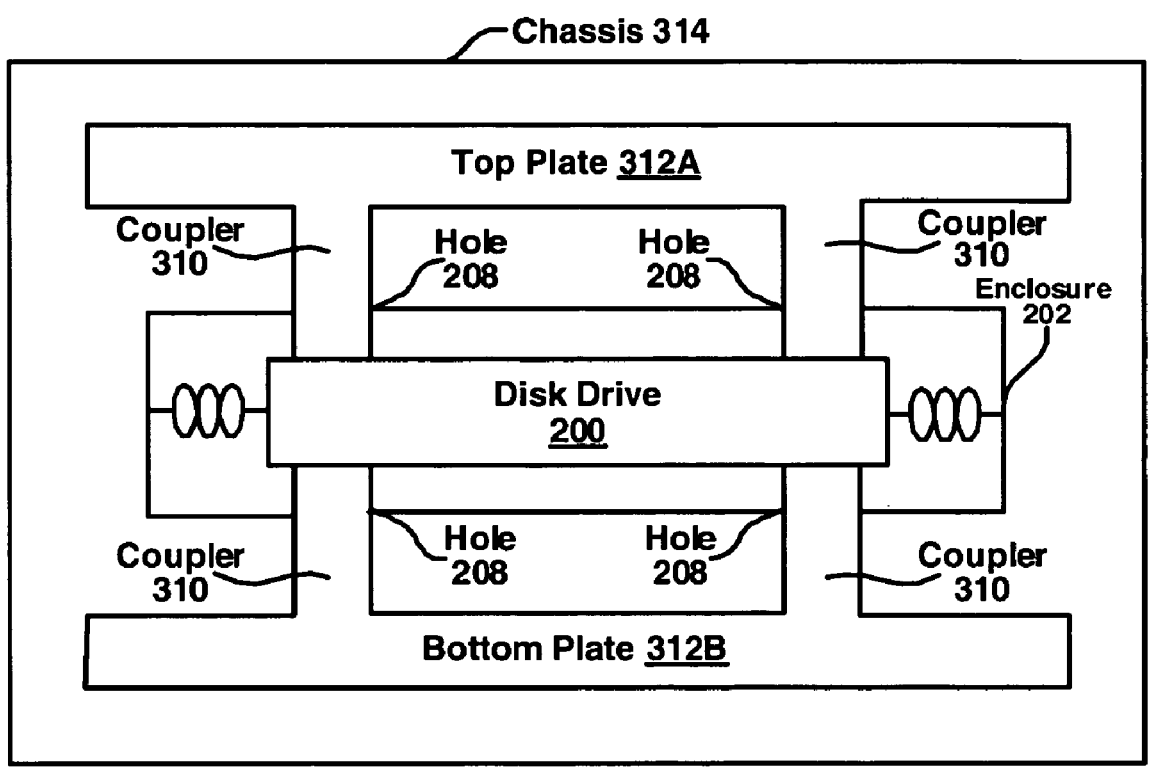
Figure 3C:
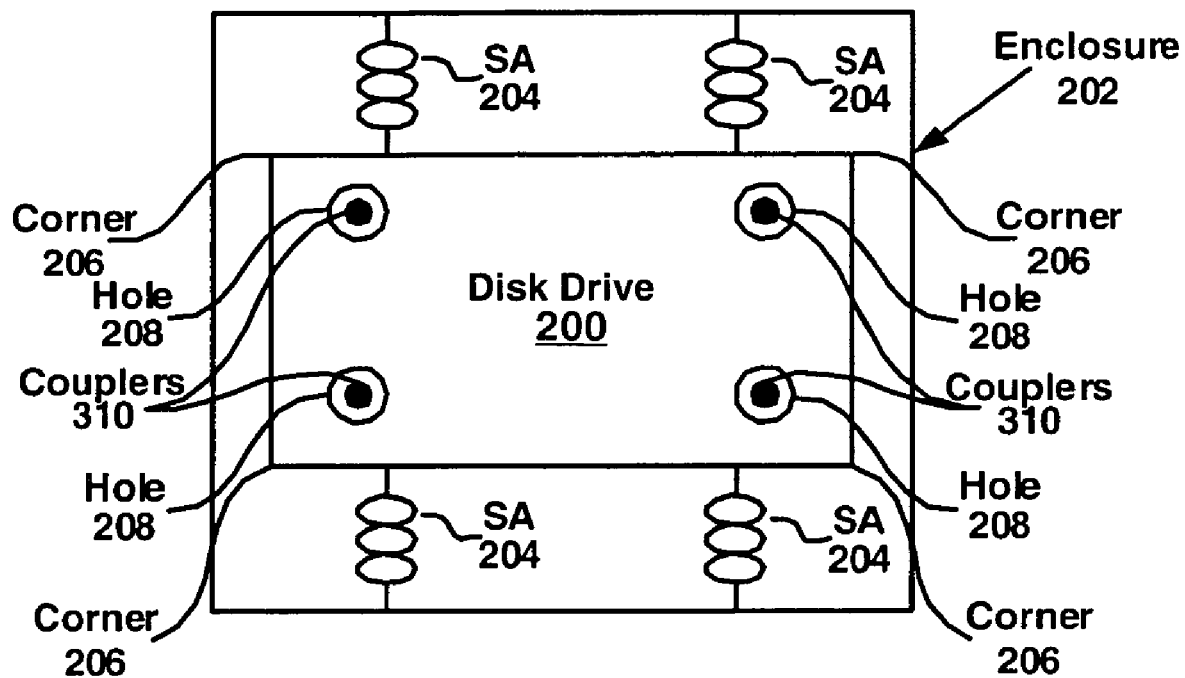

FIGS. 3A–3C depict an apparatus that includes a disk drive coupling apparatus, according to embodiments of the present invention. FIG. 3A is a side view along the y-axis 116 of the apparatus, and FIG. 3B is a side view along the x-axis 112 of the apparatus, FIG. 3C is a top view of the apparatus. The apparatus includes a disk drive 200, an enclosure 202 for the disk drive 200, shock absorbers 204, holes 208 in the enclosure 202, disk drive to chassis couplers 310, a top plate 312A, a bottom plate 312B, and the chassis 314 of a computer.

Figure 4A:
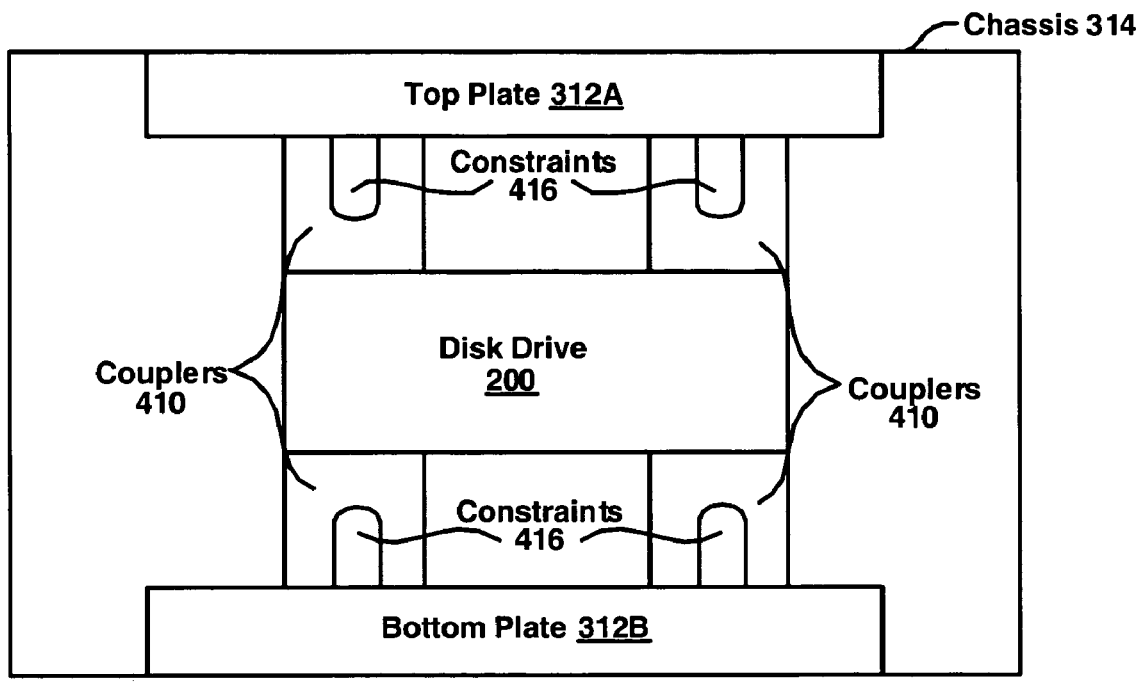
Figure 4B:
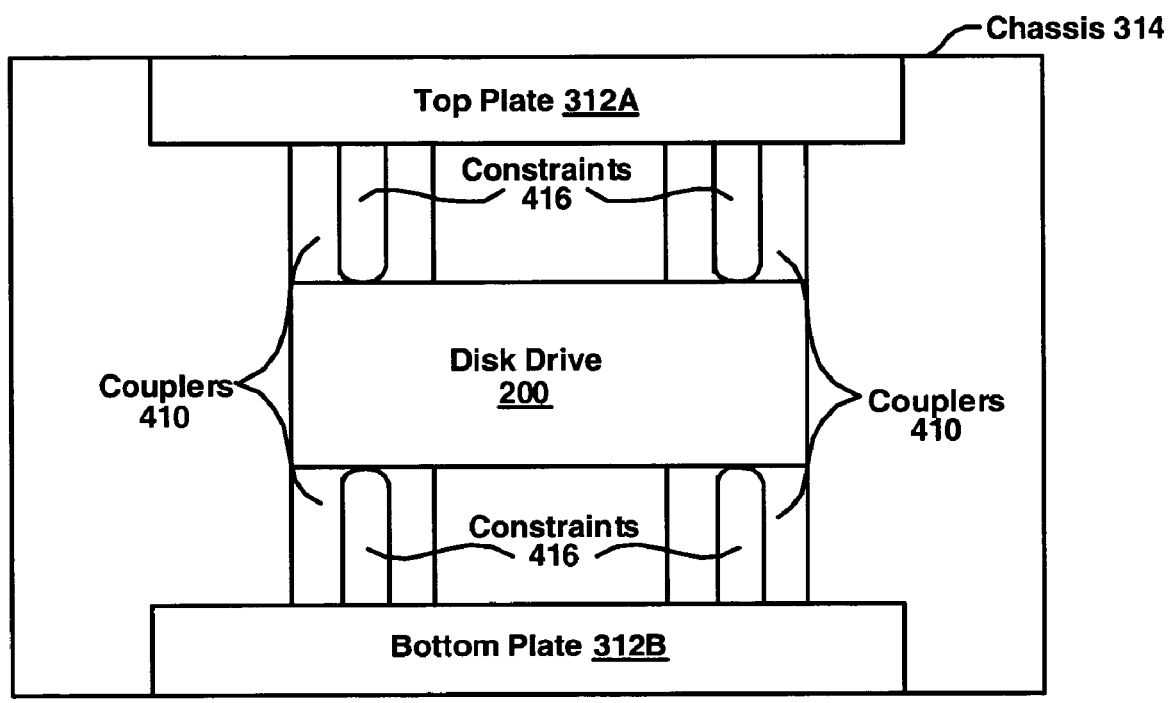

FIGS. 4A and 4B depict an apparatus that includes a disk drive coupling apparatus, according to embodiments of the present invention. In FIG. 4A, the disk drive to chassis couplers 410 are not being squeezed (e.g., couplers 410 are disengaged) and in FIG. 4B the disk drive to chassis couplers 410 are being squeezed (e.g., couplers 410 are engaged), as will become more evident. The apparatus includes a disk drive 200, disk drive to chassis couplers 410, a top plate 312A, a bottom plate 312B, and the chassis 314 of a computer. The disk drive to chassis couplers 410 can be made of a relatively pliable material, such as a dampening material. The disk drive to chassis couplers 410 can each include a constraint 416. The constraint 416 can be made of a relatively hard material, such as metal. According to another embodiment, instead of using a constraint 416 a disk drive to chassis coupler can have a special shape to enable the disk drive to chassis coupler to have a strong non-linear property (e.g., enables the disk drive to chassis coupler to become stiff when it is squeezed to various degrees), as will become more evident.

Figure 5A:
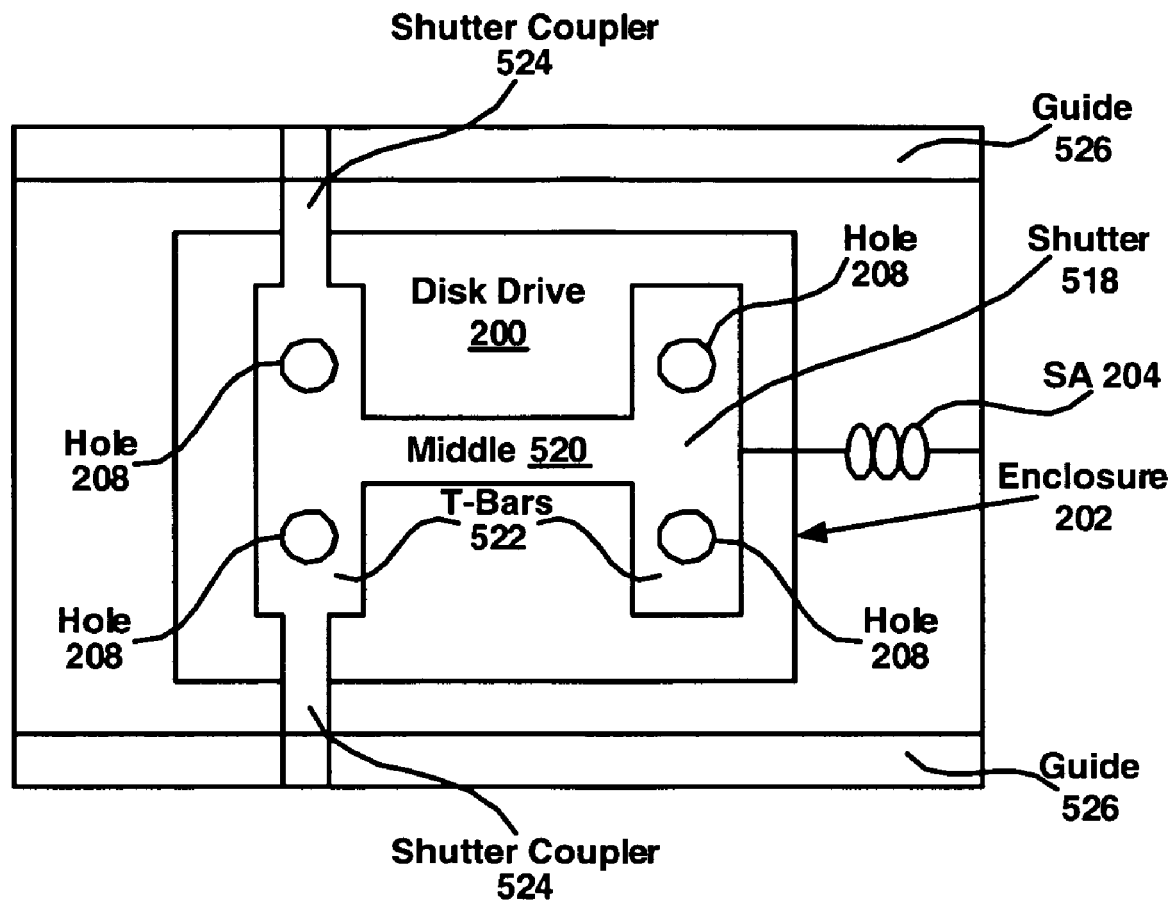
Figure 5B:
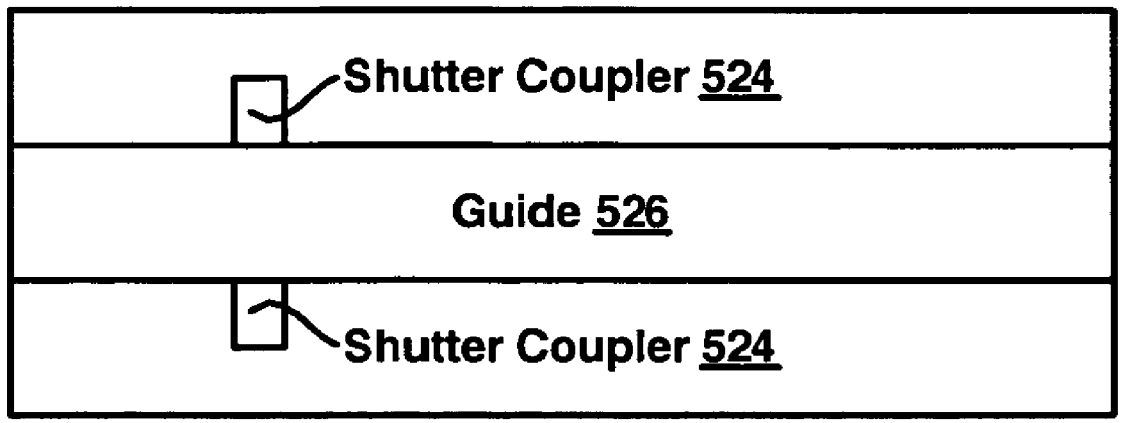
Figure 5C:
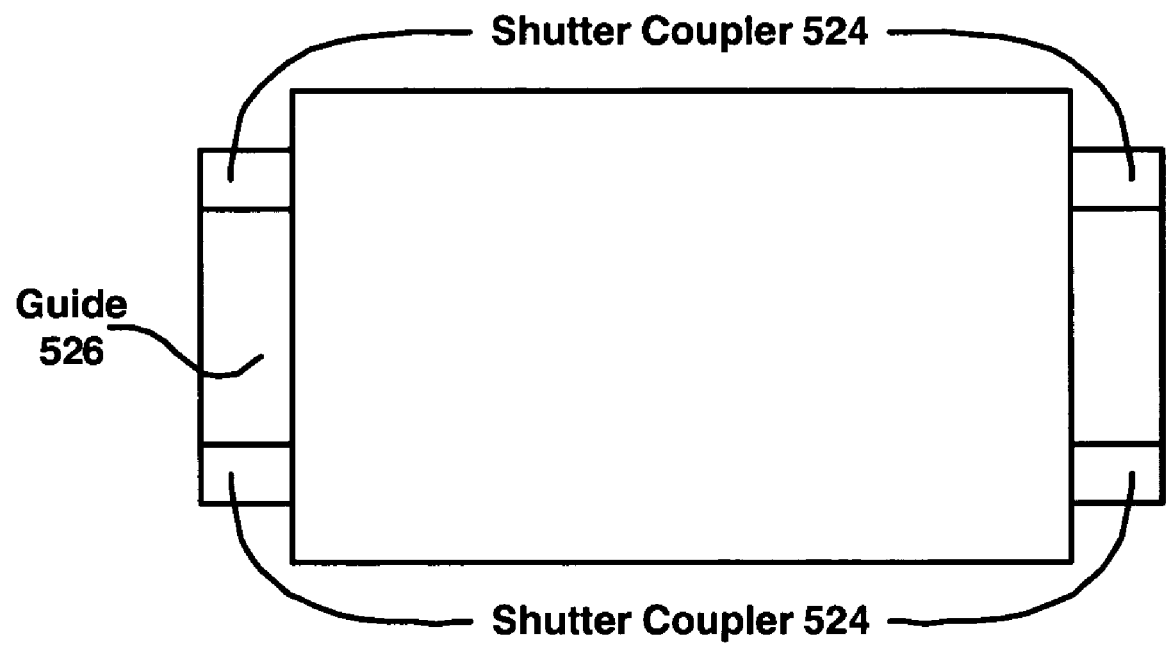

FIGS. 5A–5C depict an apparatus that includes a disk drive coupling apparatus where the apparatus is outside of a computer according to embodiments of the present invention. The apparatus includes a disk drive 200, an enclosure 202 for the disk drive 200, holes 208 in the enclosure 202, a shutter 518, shutter couplers 524, and guides 526.

Figure 6A:
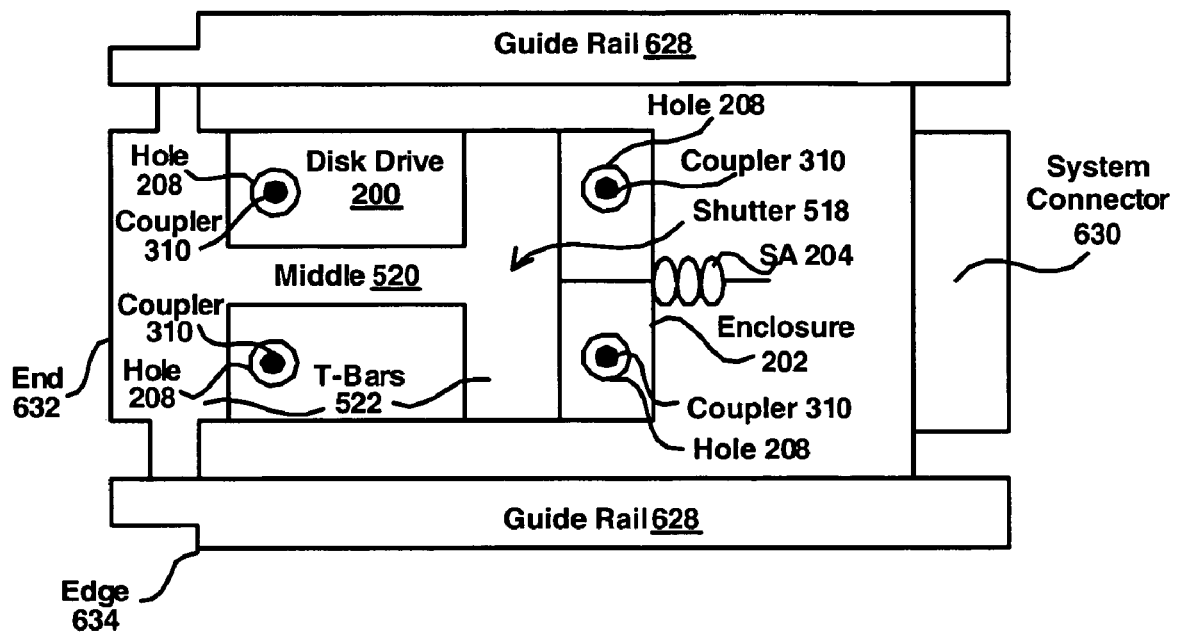
Figure 6B:
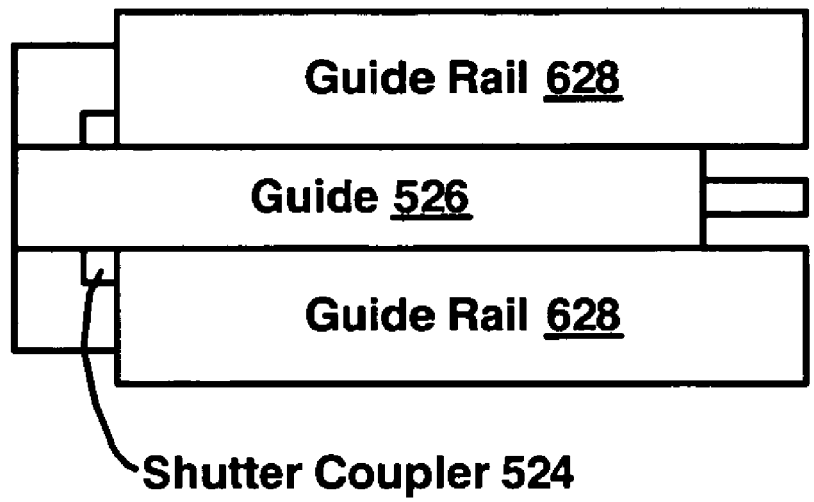
Figure 6C:
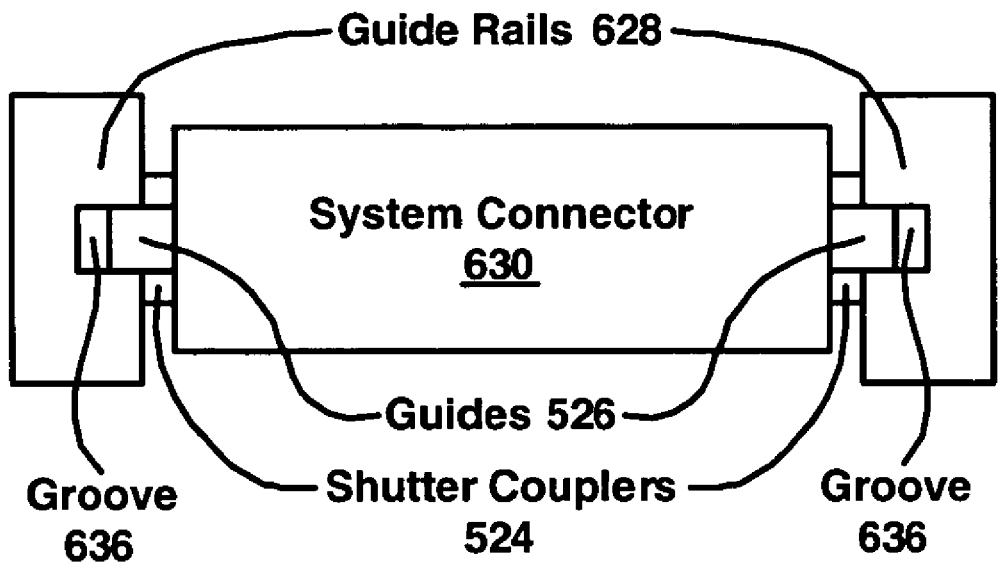

FIGS. 6A–6C depict an apparatus that includes a disk drive coupling apparatus where the apparatus is inside of a computer, according to embodiments of the present invention. The apparatus includes a disk drive 200, an enclosure 202 for the disk drive 200, holes 208 in the enclosure 202, a shutter 518, shutter couplers 524, guides 526, guide rails 628, a shock absorber 204, and a system connector 630.

The Disk Drive

Figure 7:
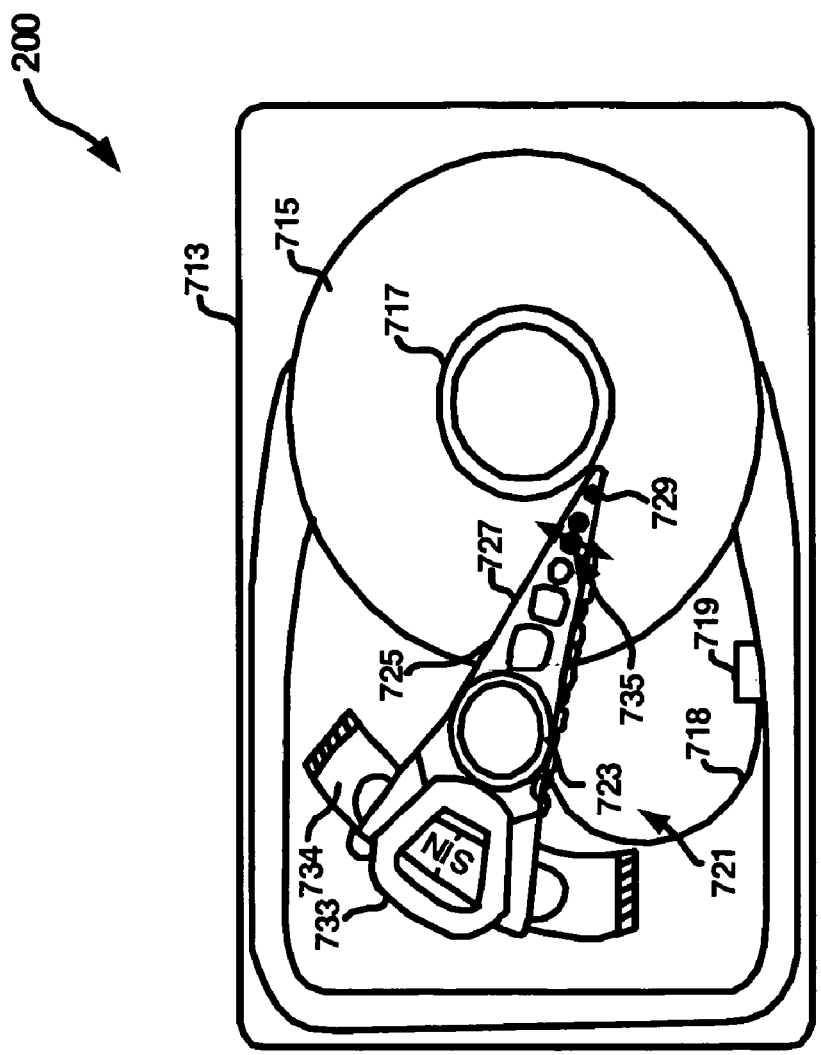
FIG. 7 is a schematic drawing of one embodiment of a magnetic disk drive or file for storing data, in accordance with the present invention.

FIG. 7 is a schematic drawing of one embodiment of a magnetic disk drive or file for storing data, in accordance with the present invention. The disk drive 200 can be a hard disk drive, or a redundant array of independent devices (RAID), for example. Disk drive 200 has an outer housing or base 713 containing a disk pack having at least one media or platter 715. The platter or platters 715 are rotated by a spindle motor assembly having a central drive hub 717. An actuator 721 comprises a plurality of parallel actuator arms 725 (one shown) in the form of a comb that is movably or pivotally mounted to base 713 about a pivot assembly 723. A controller 719 is also mounted to base 713 for selectively moving the comb of arms 725 relative to platter 715.

In the embodiment shown, each arm 725 has extending from it at least one cantilevered head gimbal assembly (HGA) 727 comprised of a mountplate, loadbeam, hinge, flexure, slider 729 and wiring to connect to the read/write transducer on the slider. A magnetic read/write transducer or head is mounted on a slider 729 and the slider is secured usually by bonding to a flexure that is flexibly mounted to the loadbeam of HGA 727. The read/write heads magnetically read data from and/or magnetically write data to platter 715.

The loadbeam and hinge of HGA 727 has a spring-like quality, which biases or presses the air-bearing surface of the slider 729 against the platter 715 to cause the slider 729 to fly at a precise distance from the disk. A voice coil 733, free to move within a conventional voice coil motor magnet assembly 734 (top pole not shown), is also mounted to arms 725 opposite the head gimbal assemblies. Movement of the actuator 721 (indicated by arrow 735) by controller 719 causes the head gimbal assemblies to move along radial arcs across tracks on the platter 715 until the heads settle on their set target tracks. The head gimbal assemblies operate in a conventional manner and always move in unison with one another, unless file 200 uses multiple independent actuators (not shown) wherein the arms can move independently of one another.

The Chassis and the Disk Drive Enclosure

The chassis 314, according to one embodiment, is the chassis 314 of a computer. The chassis 314 can be the housing of a redundant array of independent devices (RAID), according to another embodiment. The top plate 312A and the bottom plate 312B can be a part of the chassis 314.

According to one embodiment, the disk drive enclosure 202 has holes 208. For example, FIGS. 3A–3C, 5A, 6A depict an enclosure 202 with holes 208. The holes 208 can be used for allowing heat to dissipate from a disk drive 200 that is in operation, as will become more evident.

According to one embodiment, the enclosure 202 is not required. For example, FIGS. 4A, 4B depict an apparatus that includes a disk drive coupling apparatus without a disk drive enclosure 202.

Disk Drive to Chassis Couplers

Figure 8A:
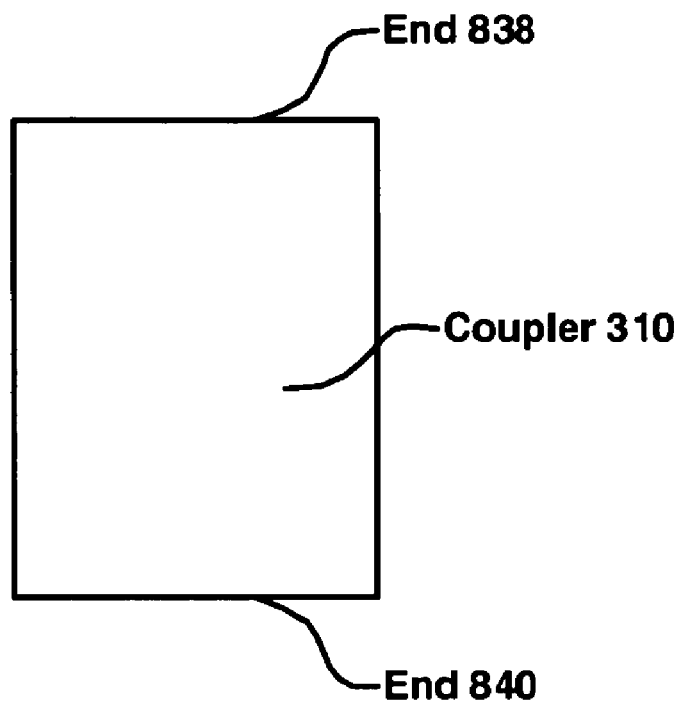
FIGS. 8A–8E depict disk drive to chassis couplers, according to embodiments of the present invention.
Figure 8B:
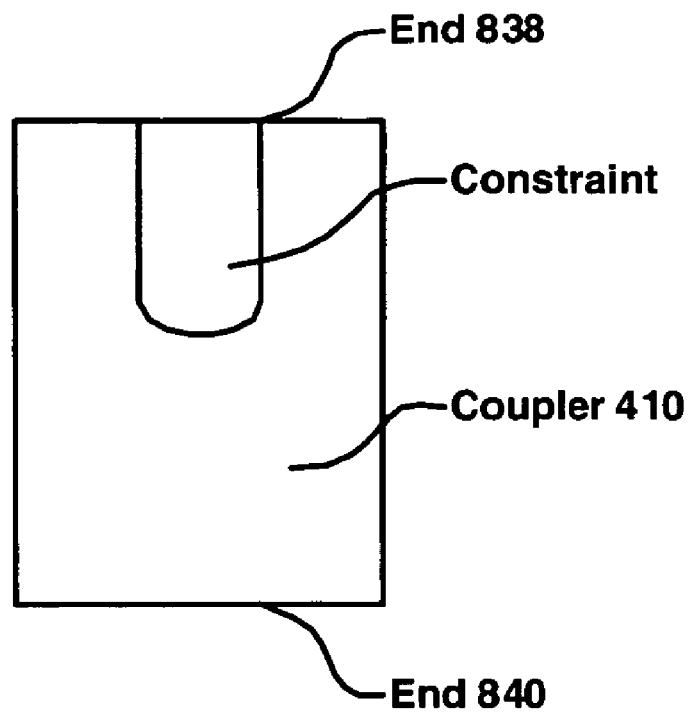
Figure 8C:
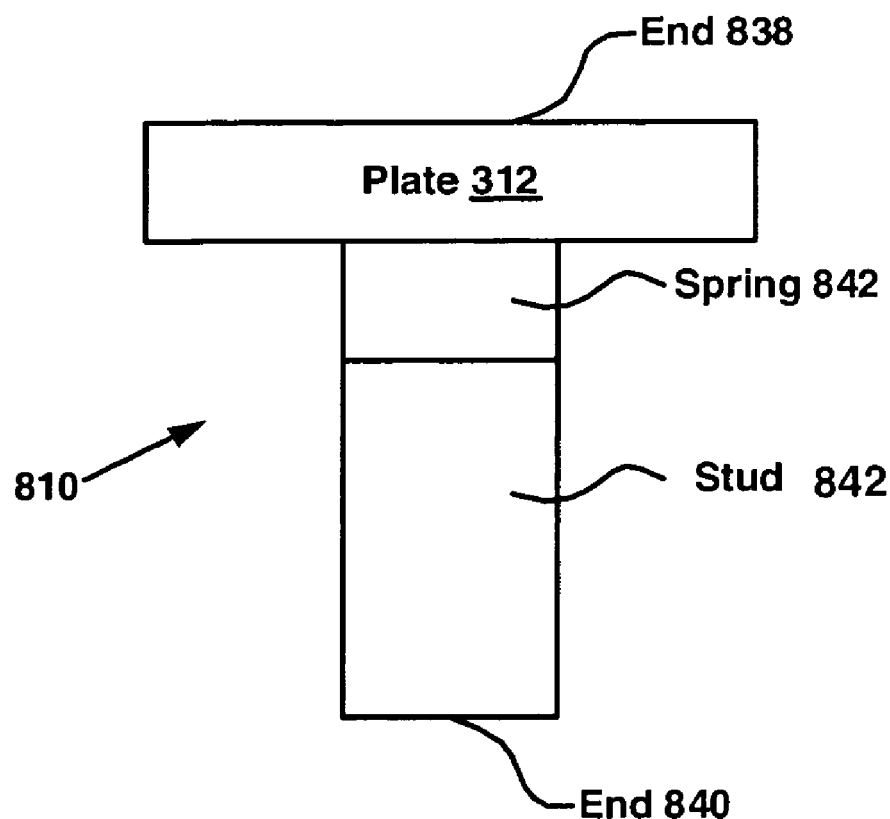

FIGS. 8A–8E depict disk drive to chassis couplers, according to embodiments of the present invention. Referring to FIGS. 8A 8C the disk drive to chassis couplers 310, 810 can be made of a relatively rigid material, according to one embodiment. Examples of a relatively rigid material include, but are not limited to, metal, such as steel, and hard plastic. Referring to FIG. 8B, according to another embodiment, the disk drive to chassis couplers 410 can include a constraint 416 inside of the disk drive to chassis coupler 410. The disk drive to chassis coupler 410 can have a hollow core that the constraint 416 is inserted into at the end 838. One end of the constraint 416 can be flush with one end 830 of the disk drive to chassis coupler 410. The constraint 416 can be made of a relatively rigid material and the rest of the disk drive to chassis coupler 410 that surrounds the constraint 416 can be made of a pliable material. Examples of pliable materials include, but are not limited to, gels, foams, rubbers, dampening materials, and springs.

Referring to FIG. 8C, a disk drive to chassis coupler 810 can include a stud 842, a plate 312, such as top plate 312A or bottom plate 312B, and/or a spring 842. The stud 842 can have a structure similar to either the coupler 310 depicted in FIG. 8A or the coupler 410 depicted in FIG. 8B. The plate and/or the spring 842 can be associated with the stud 842 at the end 838. For example, the spring 842 can be coupled to the stud 842, then the plate 312 can be coupled to the spring 842, as depicted in FIG. 8C. Alternatively, the plate 312 can be coupled to the stud 842 and the spring 842 can be coupled to the plate 312. The pliable material can be associated with the stud 842 at the end 840.

Figure 8D:
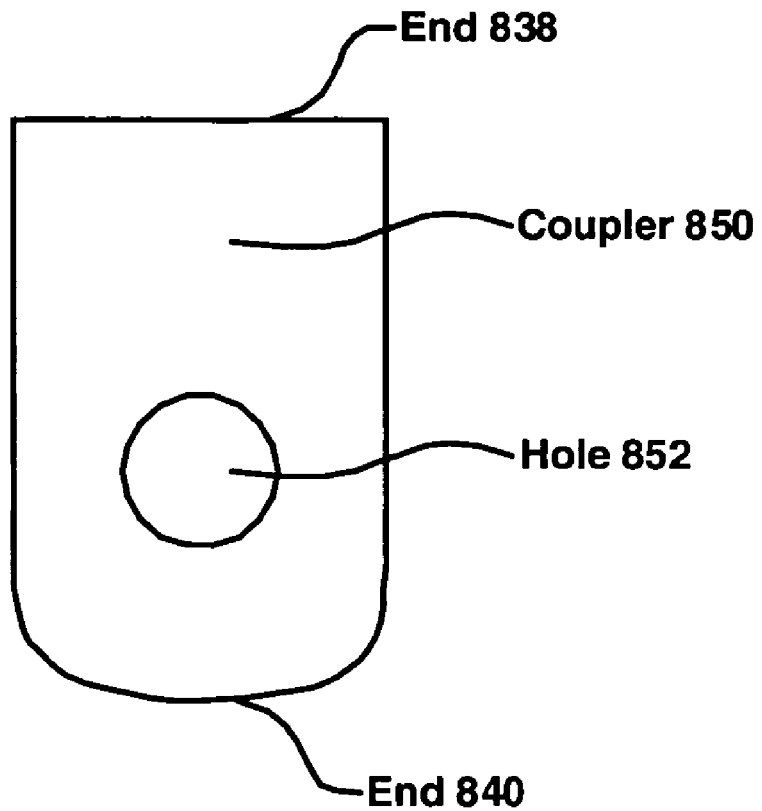
Figure 8E:
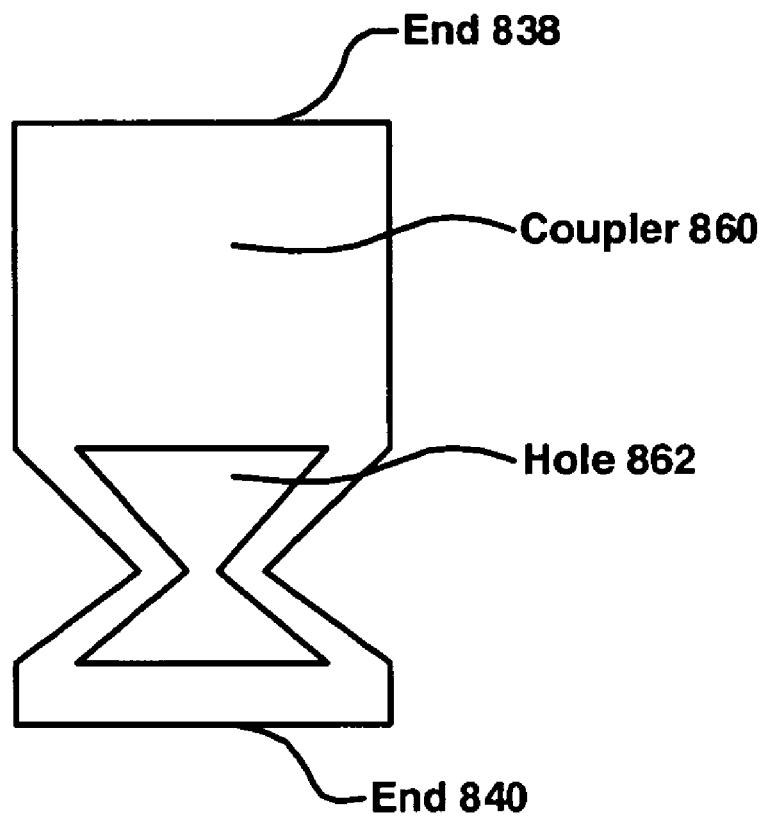

FIGS. 8D and 8E depict cross section views of disk drive to chassis couplers, according to one embodiment of the present invention. As already stated, according to another embodiment, instead of using a constraint 416 a disk drive to chassis coupler 850, 860 can have a special shape to enable the disk drive to chassis coupler 850, 860 to have a strong non-linear property (e.g., enables the disk drive to chassis coupler to become stiff when it is squeezed to various degrees), as will become more evident. For example, disk drive to chassis couplers 850, 860 have holes 852, 862 respectively. The couplers 850, 860 can be made of a pliable material. Examples of pliable materials include, but are not limited to, gels, foams, rubbers, dampening materials, and springs.

The disk drive to chassis couplers 310, 410, 810, 850, 860 can be an integral part of, among other things, the chassis 314, the disk drive 200, etc. For example, one end 838 of a coupler 310, 410, 810, 850, 860 can be coupled to the chassis 314 and the engaging mechanism can cause the other end 840 of the coupler 310, 410, 810, 850, 860 to apply pressure to the disk drive 200.

A disk drive to chassis coupler 310, 410, 810, 850, 860 can be used as a heat sink that transfers heat away from the disk drive 200. For example, a coupler 310 can be made of a thermally conductive material, such as metal.

Disk Drive to Chassis Coupler Engaging Mechanism

The disk drive to chassis coupler engaging mechanism can be used to cause the end 840 of a disk drive to chassis coupler 310, 410, 810, 850, 860 to apply pressure to a disk drive 200. For example, the engaging mechanism can cause disk drive to chassis couplers 310, 410, 810, 850, 860 to be pressed (e.g., squeezed), for example in a vertical direction, at end 840 against disk drive 200. How rigidly the disk drive 200 is coupled to the chassis 314 can be controlled, at least in part, by the amount of pressure that the engaging mechanism causes the disk drive to chassis couplers 310, 410, 810, 850, 860 to apply to the disk drive 200 at the end 840 of the coupler 310, 410, 810, 850, 860, for example. A constraint 416 (FIG. 8B) can be used for limiting the extent to which a disk drive to chassis coupler 410 can be pressed against a disk drive 200.

According to one embodiment, the disk drive to chassis coupler engaging mechanism can be engaged or disengaged using mechanical, electrical, and/or magnetic mechanisms, or any combination thereof. For example, while a computer that includes a disk drive 200 is performing read and/or write operations, the disk drive to chassis coupler engaging mechanism can be engaged, thus, rigidly coupling the disk drive 200 to the chassis 314 of the computer. In so doing, the vibrations resulting from the arm moving or vibrations from environment that is usually amplified by shock absorber 204 in the certain frequency range will not interfere with the disk drive 200's performance, as already described herein. Other times when the engaging mechanism can be engaged include, but are not limited to, when the disk drive 200 is inserted into a computer and when the computer is powered on. However, in situations when it may be advantageous to use the shock absorbers 204 to protect the disk drive 200 from damage, for example, while a computer is being transported or handled outside of a computer, the disk drive to chassis coupler 310 could be disengaged, thus, the shock absorbers 204 can absorb shocks that result from the computer being moved around. Times when the engaging mechanism can be disengaged include, but are not limited to, when the disk drive 200 is outside of a computer, when the computer is off, when the computer is not performing read and/or write operations, when the read/write head is not on the rotating platter 715, or when a button or a lever is pressed, for example.

The disk drive to chassis engaging mechanism can be integral with any one or more parts associated with the computer, such as the disk drive 200, the chassis 314, etc. For example, mechanical, electrical, and/or magnetic mechanisms that are a part of the engaging mechanism can be an integral part of the computer. More specifically, in a first example, pressing a button or a lever can cause electrical and/or mechanical parts, among other things, that are a part of the computer to engage or disengage the disk drive to chassis engaging mechanism. In a second example, a pin can be associated with the chassis 314 of the computer. The disk drive 200 can trigger the pin, for example, when the disk drive 200 is associated with the chassis 314, for example, by inserting or removing the disk drive 200 into the computer. In a third example, the disk drive to chassis engaging mechanism can be an electrical mechanism that is triggered when the computer is turned on or off, or when a read or write operation is performed, or the read/write head is on or out of the rotating platter 715, or when a button or lever is pressed. In a fourth example, a computer can include a magnetic mechanism that detects the presence or the absence of the disk drive 200 in the computer.

According to one embodiment, a single action can trigger the engaging mechanism to cause a disk drive to chassis coupler 310, 410, 810, 850, 860 be to rigidly couple (e.g., engage) the disk drive 200 to the chassis 314. Examples of a single action in this case include, but are not limited to, pushing a button, pressing a lever, inserting the disk drive 200 into the computer, detecting a read and/or write operation, detecting the read/write head is on the rotating platter 715, turning the computer on. A mechanical, an electrical, and/or a magnetic mechanism, among other things, can be used for detecting the single action.

According to one embodiment, a single action can trigger the engaging mechanism to discontinue rigidly couple (e.g., disengaging) the disk drive 200 to the chassis 314. Examples of a single action in this case include, but are not limited to, pushing a button, pressing a lever, removing the disk drive 200 from the computer, detecting that the disk drive 200 has stopped reading and/or writing operations, detecting that the read/write head is not on the rotating platter 715, turning the computer off. A mechanical, an electrical, and/or a magnetic mechanism, among other things, can be used for detecting the single action.

The Shutter

Referring to FIGS. 5A and 6A, the shutter 518 can be used for uncovering or covering the holes 208 in a disk drive 200's enclosure 202. The shutter 518 can be formed in the shape of the capital letter "I," where the shutter 518 includes a middle 520 and two T bars 522 that are connected together by the middle 520. The shutter 518 can include shutter couplers 524 at, for example, one end of the shutter 518. According to one embodiment, the shutter 518 covers the holes 208 when the disk drive 200 is not inside of a computer and exposes (e.g., uncovers) the holes 208 when the disk drive 200 is inside of the computer. According to one embodiment, a spring bias force can be used for causing the shutter 518 to cover the holes 208. According to another embodiment, the edge 634 of guide rails 628 can cause the shutter 518 to be moved backwards, thus, uncovering the holes 208, as will become more evident.

Guides and Guide Rails

Referring to FIGS. 5A–6C, the guides 526 and the guide rails 628 can be used for installing a disk drive 200 into a computer, according to embodiments of the invention. Referring to FIG. 6C, the guide rails 628 can have a groove 636 in the middle 520. The guides 526 can be, for example, square or rectangular shaped, among other things.

Method of Manufacturing a Disk Drive Coupling Apparatus

Figure 9:
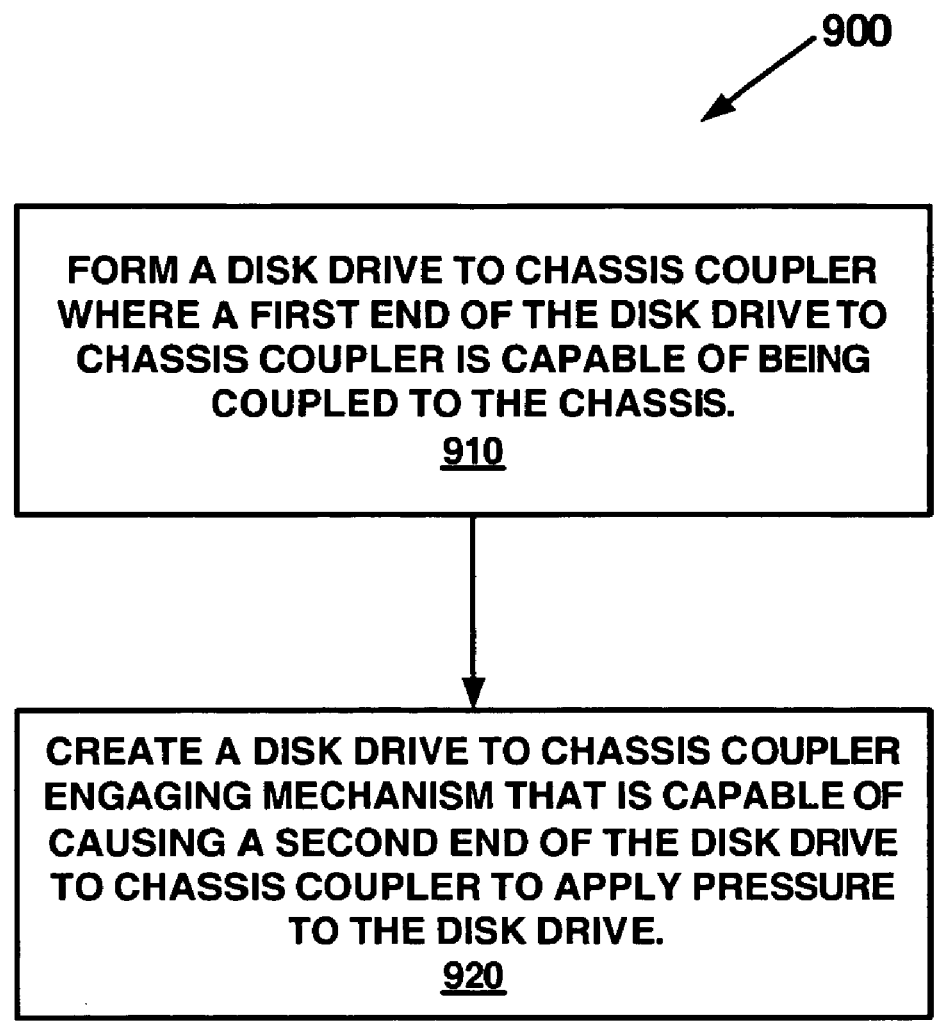
FIG. 9 is a flow chart for a method of manufacturing a disk drive coupling apparatus, according to embodiments of the present invention.

FIG. 9 is a flow chart for a method of manufacturing a disk drive coupling apparatus, according to embodiments of the present invention. Although specific steps are disclosed in flowchart 900, such steps are exemplary. That is, embodiments of the present invention are well suited to performing various other steps or variations of the steps recited in flowchart 900. It is appreciated that the steps in flowchart 900 may be performed in an order different than presented, and that not all of the steps in flowchart 900 may be performed. All of, or a portion of, the embodiments described by flowchart 900 can be implemented using computer-readable and computer-executable instructions which reside, for example, in computer-usable media of a computer system or like device. For the purposes of illustration, the discussion of flowchart 900 shall refer to the structures depicted in FIGS. 2A–8E.

In step 910, a disk drive to chassis coupler is formed where a first end of the disk drive to chassis coupler is capable of being coupled to the chassis, according to one embodiment. For example, one end 838 of a disk drive to chassis coupler 310, 410, 810, 850, 860 (also known as a "coupling means") is capable of being coupled to a chassis 314 of a computer. For example, when the disk drive 200 is inserted into the computer, the end 838 of a disk drive to chassis coupler 310 can be coupled to the chassis 314. Additionally, any method of coupling, such as bolting, welding, riveting, screwing, groove and joint, clamping, etc., can be used to couple the end 838 of a disk drive to chassis coupler 310, 410, 810, 850, 860 to the chassis 314.

Referring to FIGS. 8A, 8C, disk drive to chassis couplers 310, 810 can be formed out of a relatively rigid material, according to one embodiment. Referring to FIG. 8B, according to another embodiment, a disk drive to chassis couplers 410 can include a constraint 416 inside of the disk drive to chassis coupler 410. The disk drive to chassis coupler 410 can have a hollow core that the constraint 416 is inserted into at one end. One end of the constraint 416 can be flush with one end 838 of the disk drive to chassis coupler 410. The constraint 416 can made of a relatively rigid material and the rest of the disk drive to chassis coupler 410 that surrounds the constraint 416 can be made of a pliable material.

Referring to FIG. 8C, a disk drive to chassis coupler 810 can include a stud 842, a plate 312, such as top plate 312A or bottom plate 312B, and/or a spring 842. The stud 842 can have a structure similar to either the coupler 310 depicted in FIG. 8A or the coupler 410 depicted in FIG. 8B.

According to one embodiment, a disk drive to chassis coupler 850, 860 can have a special shape to enable the disk drive to chassis coupler 850, 860 to have a strong non-linear property (e.g., enables the disk drive to chassis coupler to become stiff when it is squeezed to various degrees), as will become more evident. For example, disk drive to chassis couplers 850, 860 have holes 852, 862 respectively. The couplers 850, 860 can be made of a pliable material. Examples of pliable materials include, but are not limited to, gels, foams, rubbers, dampening materials, and springs.

Referring to FIGS. 5A–5C, guides 526 can be coupled to the sides of the disk drive 200. A shutter 518 can be created and coupled to the disk drive 200. Shutter couplers 524 can be used to couple the shutter 518 to the guides 526. Referring to FIGS. 6A–6C, guide rails 628 can be coupled to the chassis 314.

In step 920, a disk drive to chassis coupler engaging mechanism is created that is capable of causing a second end of the disk drive to chassis coupler to apply pressure to the disk drive so that the disk drive is rigidly coupled to the chassis, according to one embodiment. For example, a disk drive to chassis coupler engaging mechanism can be created so that it can cause the end 840 of a disk drive to chassis coupler 310, 410, 810, 850, 860 to apply pressure to a disk drive 200. For example, the engaging mechanism can be created to cause disk drive to chassis couplers 310, 410, 810, 850, 860 to be pressed (e.g., squeezed), for example in a vertical direction, at end 840 against a disk drive 200. How rigidly the disk drive 200 is coupled to the chassis 314 can be controlled, at least in part, by the amount of pressure that the engaging mechanism causes the disk drive to chassis couplers 310, 410, 810, 850, 860 to apply to the disk drive 200 at the end 840, for example. The degree of how rigidly a disk drive to chassis engaging mechanism couples a disk drive 200 to a chassis 314 can be controlled, for example, by the stiffness of the spring (FIG. 8C), among other things.

According to one embodiment, the disk drive to chassis coupler engaging mechanism can be engaged or disengaged using mechanical, electrical, and/or magnetic mechanisms, or any combination thereof, as already described herein. The disk drive to chassis engaging mechanism can be integral with any one or more parts associated with the computer, such as the disk drive 200, the chassis 314, etc., as described herein.

Method of Using a Disk Drive Coupling Apparatus

Figure 10:
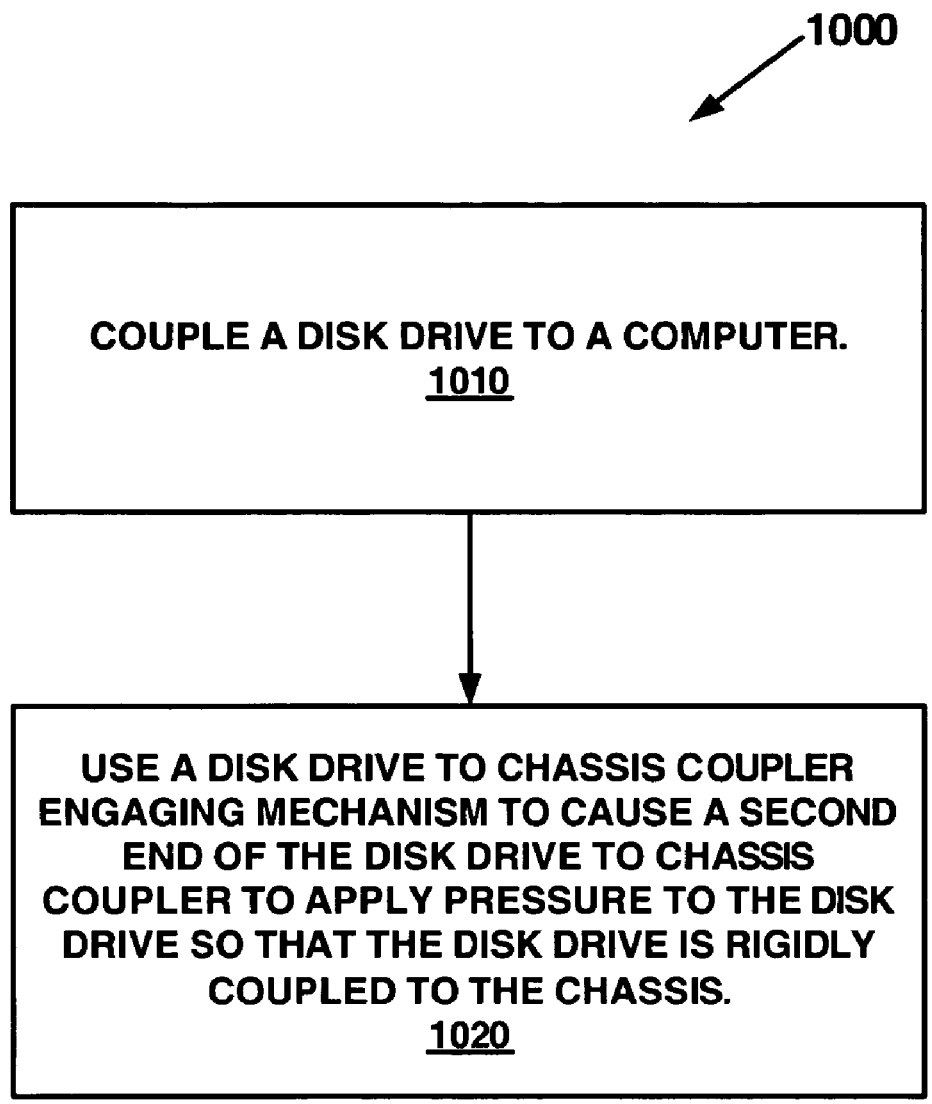
FIG. 10 is a flow chart for a method of manufacturing a disk drive coupling apparatus, according to embodiments of the present invention.

FIG. 10 is a flow chart for a method of manufacturing a disk drive coupling apparatus, according to embodiments of the present invention. Although specific steps are disclosed in flowchart 1000, such steps are exemplary. That is, embodiments of the present invention are well suited to performing various other steps or variations of the steps recited in flowchart 1000. It is appreciated that the steps in flowchart 1000 may be performed in an order different than presented, and that not all of the steps in flowchart 1000 may be performed. All of, or a portion of, the embodiments described by flowchart 1000 can be implemented using computer-readable and computer-executable instructions which reside, for example, in computer-usable media of a computer system or like device. For the purposes of illustration, the discussion of flowchart 1000 shall refer to the structures depicted in FIGS. 2A–8E.

The shutter 518 can cover the holes 208 (as depicted in FIG. 5A) for example while a disk drive 200, which includes a disk drive coupling apparatus, is outside of a computer. The guide rails 628 (as depicted in FIGS. 6A–6C) can be coupled to the chassis 314, for example, prior to associating the disk drive 200 with the computer.

In step 1010, a disk drive is coupled with the computer, according to an embodiment. For example, a disk drive 200 can be inserted into the computer from one end (FIG. 6A). As a part of associating the disk drive 200 with the computer, the guides 526 can be slide down the grooves 636 of the guide rails 628 when a disk drive 200 is inserted into the computer. The edge 634 of guide rails 628 can cause the shutter 518 to be moved backwards, thus, uncovering the holes 208.

The end 838 of a disk drive to chassis coupler 310, 410, 810, 850, 860 is capable of being coupled to a chassis 314 of a computer, according to one embodiment. For example, when the disk drive 200 is inserted into one end 632 (FIG. 6A) of the computer, the end 838 of a disk drive to chassis coupler 310, 410, 810, 850, 860 can be coupled to the chassis 314 by coming into contact with the chassis 314. Additionally, any method of coupling, such as bolting, welding, riveting, screwing, tong and groove joint, clamping, etc., can be used to couple the end 838 of a disk drive to chassis coupler 310, 410, 810, 850, 860 to the chassis 314.

The shutter 518 can be moved backwards, for example by inserting the disk drive 200 into the computer, thus, uncovering the holes 208. The holes 208 can be uncovered, for example, when the edges 634 of the guide rails 628 come into contact with the shutter guides 526 which causes the shutter 518 to be moved backwards, thus, uncovering the holes 208. The system connector 630 can connect the disk drive 200 to the computer at the other end, for example, by connecting to a shock absorber 204. The uncovered holes 208 can be used for dissipating heat caused, for example, by the operation of the disk drive 200.

In step 1020, a disk drive to chassis coupler engaging mechanism is used to cause a second end of a disk drive to chassis coupler to apply pressure to the disk drive so that the disk drive is rigidly coupled to the chassis. For example, according to one embodiment, a single action can trigger the engaging mechanism to cause a disk drive to chassis coupler 310, 410, 810, 850, 860 to begin rigidly coupling (e.g., engaging) the disk drive 200 to the chassis 314. Examples of a single action in this case include, but are not limited to, pushing a button, pressing a lever, inserting the disk drive 200 into the computer, detecting a read and/or write operation, detecting the read/write head on the rotating platter, turning the computer on. A mechanical, an electrical, and/or a magnetic mechanism, among other things, or any combination thereof, can be used for detecting the single action.

According to one embodiment, a single action can trigger the engaging mechanism to discontinue rigidly couple (e.g., disengaging) the disk drive 200 to the chassis 314. Examples of a single action in this case include, but are not limited to, pushing a button, pressing a lever, removing the disk drive 200 from the computer, detecting that the disk drive 200 has stopped a read and/or write operation, detecting that the read/write head is not on the rotating platter, turning the computer off. A mechanical, an electrical, and/or a magnetic mechanism, among other things, or any combination thereof, can be used for detecting the single action.

Referring to FIGS. 3A–3C, FIGS. 4A, 4B FIGS. 6A–6C, and FIGS. 8A–8E the disk drive to chassis coupler engaging mechanism can be used to cause the end 840 of a disk drive to chassis coupler 310, 410, 810, 850, 860 to apply pressure to a disk drive 200. For example, as depicted in FIGS. 3A–3C, 6A–6C, 8A–8C the engaging mechanism can cause the end 840 of a disk drive to chassis coupler 310, 410, 810, 850, 860 to be inserted through a hole 208 (FIGS. 2A, 2B, 3A–3C, 5A, 6A) in a disk drive 200's enclosure 202 and come into contact with the disk drive 200. Alternatively, referring to FIGS. 4A, 4B if there is no enclosure 202, then there are no holes 208 that the engaging mechanism would cause the disk drive to chassis coupler 410 to be inserted into. Referring to FIGS. 8D, 8E, disk drive to chassis couplers 850, 860 can also be used to couple a disk drive, which is not inside of an enclosure, to a chassis, according to another embodiment.

Further, in the case of a disk drive to chassis coupler 410 that includes a constraint 416 made of relatively rigid material and surrounded by relatively pliable material (as depicted in FIG. 4B), the engaging mechanism is capable of causing the disk drive 200 to be rigidly couple to the chassis 314 by causing the disk drive to chassis coupler 310, 410, 810, for example, to be squeezed against the disk drive 200 (e.g., the engaging mechanism is "engaged"). The constraints 416 can provide a limit as to how far the disk drive to chassis couplers 310 can be squeezed against the disk drive 200. However, as depicted in FIG. 4A, the disk drive to chassis couplers 410 are not being squeezed against the disk drive 200 (e.g., the engaging mechanism is "disengaged").

When the disk drive to chassis couplers 310, 410, 810, 850, 860 come into contact with the disk drive 200, they can be used as heat sinks, for example, by transferring heat away from the disk drive 200.

Alternatives and Extensions

Although many of the embodiments have been described with one end 838 being coupled to the chassis 314 and an engaging mechanism causing the other end 840 to apply pressure to the disk drive 200, instead embodiments of the invention could instead have end 840 being coupled to the disk drive 200 and the engaging mechanism causing the other end 838 to apply pressure to the chassis 314.

Although many of the embodiments have been described with end 838 being capable of being coupled to a chassis 314 and end 840 as being pressed against a disk drive 200, according to embodiments of the present invention, either end 838 or end 840 can be a first end that is capable of being coupled to either the chassis 314 or the disk drive 200. Similarly, either end 838 or end 840 can be a second end that is capable of being pressed against to either the chassis or the disk drive 200.

What is claimed is:

1. A disk drive coupling apparatus for rigidly coupling a disk drive to a chassis of a computer, the disk drive coupling apparatus comprising:
    a disk drive to chassis coupler, wherein a first end of the disk drive to chassis coupler is capable of being coupled to the chassis;
    a disk drive to chassis coupler engaging mechanism that is capable of causing a second end of the disk drive to chassis coupler to apply pressure to the disk drive so that the disk drive is rigidly coupled to the chassis, wherein at least a part of the disk drive to chassis coupler engaging mechanism is an integral part of the computer; and
    a shutter that can be used to one of cover or uncover a hole in an enclosure of the disk drive.

2. The disk drive coupling apparatus of claim 1, further comprising:
    an enclosure of the disk drive, wherein the enclosure includes a hole, wherein the chassis coupler engaging mechanism is capable of causing the second end of the disk drive to chassis coupler to be inserted into the hole as a part of applying pressure to the disk drive.

3. The disk drive coupling apparatus of claim 1, wherein the disk drive to chassis coupler is formed out of a relatively rigid material.

4. The disk drive coupling apparatus of claim 1, wherein the disk drive to chassis coupler is formed out of a relatively pliable material, wherein the disk drive to chassis coupler includes a constraint made out of a relatively rigid material.

5. The disk drive coupling apparatus of claim 1, wherein the disk drive to chassis coupler to includes a spring.

6. The disk drive coupling apparatus of claim 1, wherein the disk drive to chassis coupler includes a plate.

7. The disk drive coupling apparatus of claim 1, wherein the disk drive to chassis coupler engaging mechanism is capable of being disengaged.

8. The disk drive coupling apparatus of claim 1, wherein the disk drive to chassis coupler engaging mechanism can be, at least in part, selected from a group consisting of a mechanical mechanism, an electrical mechanism, and a magnetic mechanism.

9. The disk drive coupling apparatus of claim 3, wherein the disk drive to chassis coupler further comprises a relatively pliable material at the second end.

10. The disk drive coupling apparatus of claim 7, wherein the disk drive to chassis coupler engaging mechanism can be one of engaged or disengaged with a single action.

11. A disk drive coupling apparatus for rigidly coupling a disk drive to a chassis of a computer, the disk drive coupling apparatus comprising:
    a disk drive to chassis coupler, wherein a first end of the disk drive to chassis coupler is capable of being coupled to the disk drive;
    a disk drive to chassis coupler engaging mechanism that is capable of causing a second end of the disk drive to chassis coupler to apply pressure to the chassis so that the disk drive is rigidly coupled to the chassis, wherein at least a part of the disk drive to chassis coupler engaging mechanism is an integral part of the disk drive; and
    a shutter that can be used to one of cover or uncover a hole in an enclosure of the disk drive.

12. The disk drive coupling apparatus of claim 11, further comprising:
    an enclosure of the disk drive, wherein the enclosure includes a hole, wherein the chassis coupler engaging mechanism is capable of causing the second end of the disk drive to chassis coupler to be inserted into the hole as a part of applying pressure to the disk drive.

13. The disk drive coupling apparatus of claim 11, wherein the disk drive to chassis coupler is formed out of a relatively rigid material.

14. The disk drive coupling apparatus of claim 11, wherein the disk drive to chassis coupler is formed out of a relatively pliable material, wherein the disk drive to chassis coupler includes a constraint made out of a relatively rigid material.

15. The disk drive coupling apparatus of claim 11, wherein the disk drive to chassis coupler to includes a spring.

16. The disk drive coupling apparatus of claim 11, wherein the disk drive to chassis coupler includes a plate.

17. The disk drive coupling apparatus of claim 11, wherein the disk drive to chassis coupler engaging mechanism is capable of being disengaged.

18. The disk drive coupling apparatus of claim 11, wherein the disk drive to chassis coupler engaging mechanism can be, at least in part, selected from a group consisting of a mechanical mechanism, an electrical mechanism, and a magnetic mechanism.

19. The disk drive coupling apparatus of claim 13, wherein the disk drive to chassis coupler further comprises a relatively pliable material at the second end.

20. The disk drive coupling apparatus of claim 17, wherein the disk drive to chassis coupler engaging mechanism can be one of engaged or disengaged with a single action.

21. The disk drive coupling apparatus of claim 20,
wherein the single action that causes the disk drive to chassis coupler engaging mechanism to be engaged is selected from a group consisting of detecting that a platter associated with the disk drive is rotating, detecting that a read or a write operation is being performed, detecting that the computer has been turned on, detecting that the disk drive has been inserted into the computer, and
wherein the action that causes the disk drive to chassis coupler engaging mechanism to be disengaged is selected from a group consisting of detecting that the platter is not rotating, detecting that a read or a write operation is not being performed, detecting that the computer has been turned off, detecting that the disk drive has been removed from the computer.

22. A means for rigidly coupling a disk drive to a chassis of a computer, the means comprising:

coupling means for coupling the disk drive to the chassis, wherein a first end of the coupling means is capable of being coupled to the disk drive;

engaging means for causing the coupling means to apply pressure to the disk drive so that the disk drive is rigidly coupled to the chassis, wherein at least a part of the engaging means is an integral part of the computer; and shutter means that can be used to one of cover or uncover a hole in an enclosure of the disk drive.

23. A disk drive comprising:

an enclosure;

a disk pack mounted to the enclosure and having a plurality of disks that are rotatable relative to the enclosure;

an actuator mounted to the enclosure and being movable relative to the disk pack, the actuator having a plurality of heads for reading data from and writing data to the disks;

a disk drive to chassis coupler, wherein a first end of the disk drive to chassis coupler is capable of being coupled to the chassis;

a disk drive to chassis coupler engaging mechanism that is capable of causing a second end of the disk drive to chassis coupler to apply pressure to the disk drive so that the disk drive is rigidly coupled to the chassis so that the disk drive is rigidly coupled to the chassis, wherein at least a part of the disk drive to chassis coupler engaging mechanism is an integral part of the computer; and a shutter that can be used to one of cover or uncover a hole in an enclosure of the disk drive.

* * * * *